INVENTORS
THOMAS R. KOMLINE
WALTER H. SANDERSON

May 30, 1967

T. R. KOMLINE ETAL 3,322,079

SLUDGE INCINERATION

Filed Oct. 22, 1965

INVENTORS,
THOMAS R. KOMLINE
WALTER H. SANDERSON

BY Watson, Cole, Grindle & Watson

ATTORNEYS

3,322,079
SLUDGE INCINERATION
Thomas R. Komline, Gladstone, and Walter H. Sanderson, Greenbrook, N.J., assignors to Komline-Sanderson Engineering Corp., Peapack, N.J., a corporation of New Jersey
Filed Oct. 22, 1965, Ser. No. 502,149
14 Claims. (Cl. 110—8)

ABSTRACT OF THE DISCLOSURE

A method and apparatus for incinerating sewage sludge and municipal waste in which an ignited bed of the municipal waste is supported for continuous movement on a grate. An upward flow of air through the fuel is produced by suitable means and the sludge is sprayed in finely divided particles into the upwardly rising air and combustion gases above the solid fuel bed, the upwardly rising gas and air currents impeding the downward movement of said particles to increase their exposure to the heating and drying action, some of said particles being entrained and subjected to combusition in the said currents and other heavier particles descending onto the solid fuel for combustion after being subjected to such drying and heating action.

---

This invention relates to an improved process for incinerating sewage sludge as well as to an improved apparatus for carrying out such a process.

It is becoming increasingly apparent that present-day sewage treatment and disposal methods, because of their inability to keep pace with the expanding population, result in increasing pollution of available water supplies. For the same reason, the difficulty of satisfactorily disposing of municipal waste such as combustible trash and garbage is increasing.

Although suitable incinerators for municipal waste have been devised, the incineration of sewage sludge, though recognized as a highly desirable and completely sanitary means of sewage disposal, has not yet been capable of practical and economical achievement.

Attempts have been made in the past to incinerate sewage sludge by first drying it, then transferring it from the dryer onto a bed of solid fuel such as combustible municipal waste, within an incinerator. Such apparatus has not come into general usage, however, possibly because of such factors as the high cost of operation involved in the preliminary drying of the sludge, the difficulty of avoiding smothering of the fire in the solid fuel bed, arising from the tendency of the sludge due to its high sulfur content to form a slag or clinker type of ash on top of the firebed, the necessity for withdrawing heat from the firebed to raise the sludge thereon to ignition temperature, and the general complexity of the apparatus employed.

Also, as exemplified in the Komline Patent No. 2,537,467 of Jan. 9, 1951, it has been attempted to dry and burn sludge in suspension. However, the cost of auxiliary fuel for initiating and/or sustaining combustion, and certain critical operational requirements have detracted from the feasibility of this approach.

With these considerations in mind, the present invention comprises an improved process and apparatus for simultaneously incinerating both sludge and combustible municipal trash or waste, in which the waste is supported during its combustion to provide a bed of solid fuel, and subjected to a forced updraft of air therethrough. Sludge, in the form of finely-divided moist particles, is continuously laterally distributed into the combustion gases immediately above the solid fuel bed, and, when received in said updraft above the fuel bed, is separated thereby into separate categories of relatively light and heavy particles, of which only the heavy particles are consumed on the fuel bed, the light particles being burned and carried away while suspended or entrained in the fluid current formed by said updraft.

The upwardly rising heated gases serve to delay or retard the descent of the heavy particles onto the bed, whereby to prolong their drying prior to their reception on the bed. Because of their lateral dispersion during drying, the said particles may be so distributed on the bed as to avoid any substantial smothering thereof. At the same time, their direct movement from the drying chamber onto the bed without opportunity for heat loss from the particles necessitates but a minimum of heat withdrawal from the fuel bed to bring the said particles to ignition temperature. Moreover, the lighter or less dense particles suspended in the heated gases for burning and removal while entrained, will thus decrease the amount of sludge which comes to rest upon the bed of solid fuel.

An apparatus suitable for carrying out the invention is shown by way of exemplification in the accompanying drawings in which.

In the following detailed description of the preferred embodiment of the apparatus and process of the invention, certain parts and steps will be referred to in specific terms for the sake of clarity and in order to promote an understanding of the invention. It is to be understood, however, that such terminology is not intended to limit or restrict the scope of the invention, but that the invention includes all such variations or modifications of its specific disclosure herein as would be obvious to persons of ordinary skill in the art.

Figure 1:
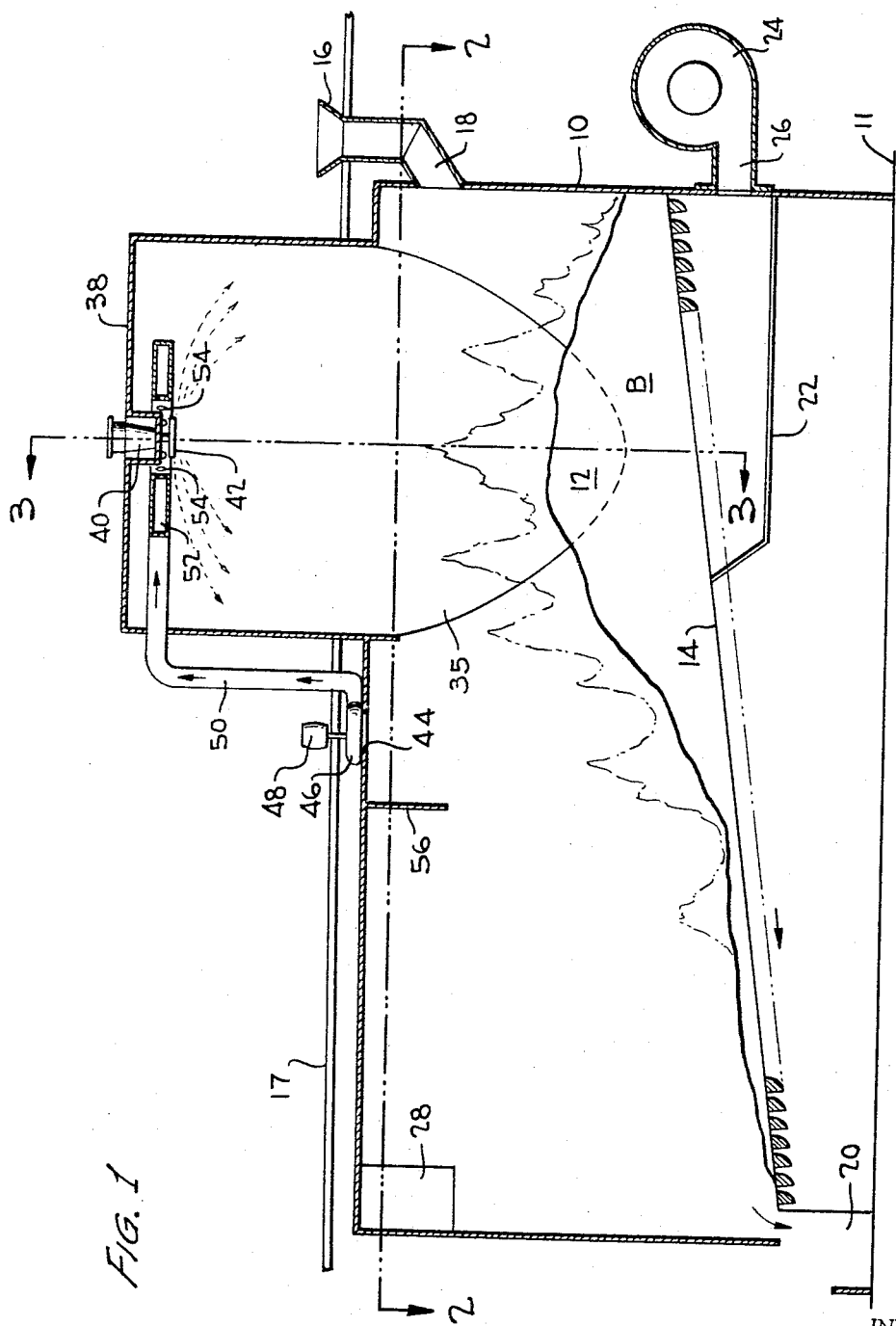
FIGURE 1 is a vertical section through such apparatus, substantially on the line 1—1 of FIGURE 2.
Figure 2:
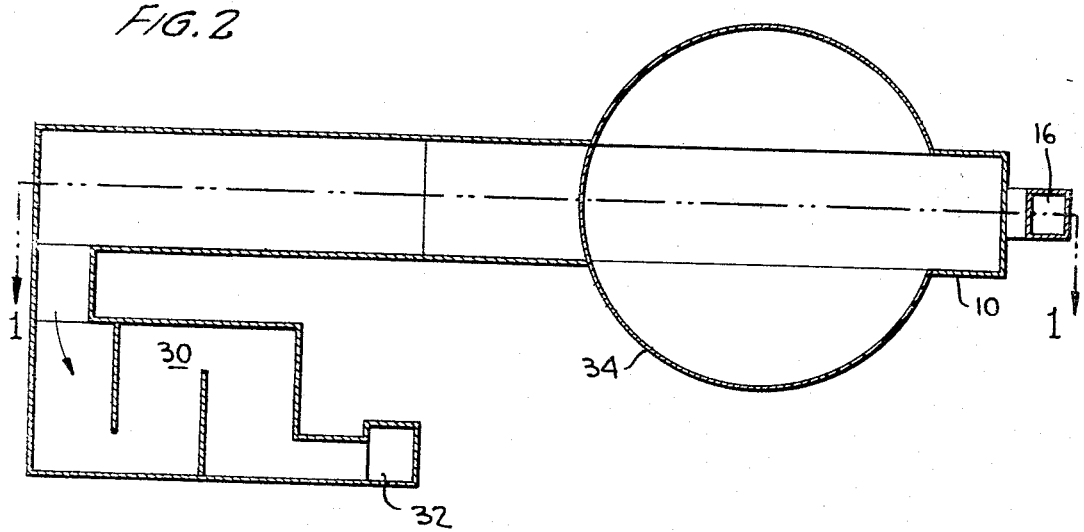
FIGURE 2 is a plan section on the line 2—2 of FIGURE 1.
Figure 3:
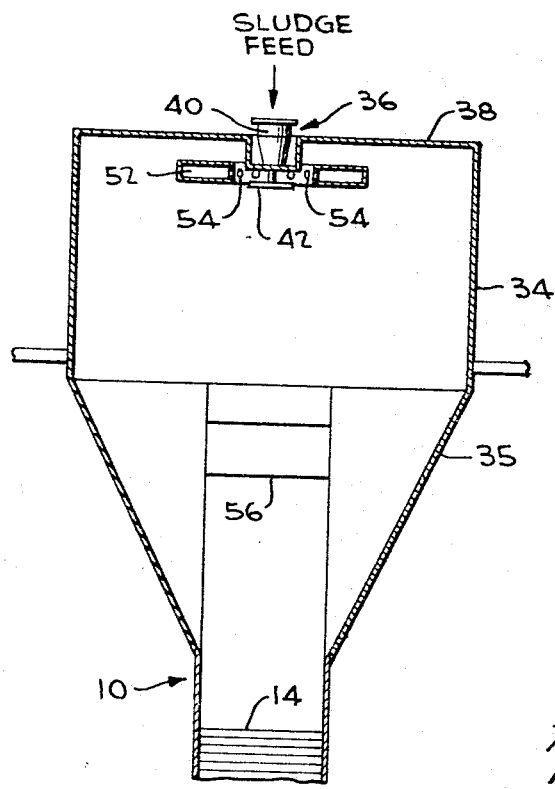
FIGURE 3 is a vertical section on the line 3—3 of FIGURE 1.

Referring now in detail to the accompanying drawings, the incinerating apparatus therein illustrated comprises an incinerator housing 10 supported on a suitable foundation 11, and defining an enclosed horizontally-elongated combustion chamber 12 within which is operatively disposed a generally conventional traveling or conveying grate structure 14, as diagrammatically illustrated in FIGURE 1. The grating 14 may be similar to that disclosed in the U.S. Patent 3,152,562 to Cohan et al., on Oct. 13, 1964, and is adapted to support for combustion on its upper surface a bed of solid fuel B which, it is contemplated, will normally comprise combustible municipal waste such as trash or trash and garbage intermixed with each other. Such municipal waste is delivered onto the forward or charging end of the grating 14 by means of a charging hopper 16 communicating with the combustion chamber through an opening 18 in the front wall of the housing at a location above the forward or charging end of the grating 14. Material is delivered into the hopper 16 from a charging floor 17.

In the embodiment illustrated, the grating is somewhat inclined downwardly from front to rear and is arranged in conventional manner to progressively convey the burning bed of solid fuel B rearwardly at a rate such that the material comprising the said bed B will be completely burned or oxidized upon reaching the rear or discharge end of the grating. The ashes will be continuously discharged from the rear end of the grating into a suitable discharge or collection means, such as exemplified by the ash pit 20 in FIGURE 1, to be thereafter disposed of as desired.

As is usual, the grating 14 is constructed to permit the free passage of combustion air upwardly through it and through the burning material supported thereon. For supplying a constant flow of air under forced draft upwardly through the forward portion of the grating 14, there is provided beneath the said grate a plenum 22, the open upper side of which communicates with the grate, and means such as the centrifugal blower 24 communicating with the plenum through a passage 26 for supplying air from the atmosphere into the plenum at super-atmospheric pressure. The air is thus caused to move upwardly through the burning solid fuel bed B to maintain the combustion of the material at a sufficiently high operating temperature. The upwardly rising air and/or combustion gases after passing from the plenum through the fuel bed B are guided or deflected rearwardly above the grating 14, by the inner configuration of the combustion chamber, so as to flow longitudinally toward the discharge port or flue 28. From the flue 28, the exhaust gases pass through a conventional scrubber 30 for the elimination of fly ash or other entrained materials, thence to and upwardly through a chimney or stack 32 for discharge into the atmosphere.

Located above the forward or charging end of the grate 14 and plenum 22 is a cylindrical drying chamber 34, having a conical lower end portion 35 merging and communicating with the incinerator housing 10. The lower axial end of chamber 34 opens downwardly into the combustion chamber 12 in spaced relation above the grate so as to constitute in effect an upward extension of the combustion chamber. Wet or liquid sludge is delivered into the drying chamber by means of the centrifugal sprayer, or atomizer, generally designated 36, supported through an opening in the closed upper end 38 of the spray drying chamber. The atomizer includes a motor 40 which is in driving relation with the rotary distributor 42 to rotate the latter at high speed about a vertical axis which is preferably coincident with the cylindrical axis of the chamber 34. The present invention is not concerned with the specific structural details of the sprayer or atomizer 36 except insofar as it exemplifies any suitable means for delivering into and generally horizontally or laterally dispersing finely divided particles of sludge across the drying chamber so that, upon settling onto the solid fuel bed B, they will be lightly and evenly distributed over the surface thereof to avoid smothering same.

A suitable form of centrifugal atomizer 36 is disclosed in detail in the Komline U.S. Patent 2,292,572 of Aug. 11, 1942, including means not herein illustrated for supplying the liquefied sludge to the atomizer as well as air cooling means for enabling same better to withstand the high temperatures to which it is necessarily subjected in operation.

Located over approximately the mid area of the grate in a fore and aft direction, and at substantially the location of the maximum heat intensity of the ignited bed of solid fuel B, is the intake or inlet port 44 of a hot gas recirculating blower 46. The blower is here illustrated as being driven by a rotary electric motor 48 to deliver the heated gases through a delivery conduit 50 back into the upper portion of the spray drying chamber 34, preferably through an annular duct or manifold 52 concentrically surrounding the centrifugal atomizer 36, and having a plurality of discharge orifices or nozzles 54 directed tangentially in the direction of rotation of the rotor 42 to contribute to the centrifugal dispersion of the particles by the distributing rotor 42 and to produce a swirling and gradually downwardly-spiraling movement of the incoming heated gases toward the open lower end of the spray drying chamber. The primary function of these heated gases is to dry the particles projected outwardly from the atomizer 36. The swirling action of the said air currents serves not only to increase the radially outward dispersion or spreading of the particles by centrifugal force, but also to create sufficient turbulence to slightly retard the downward settling of the particles and thus to increase the length of their stay in the drying chamber and the thoroughness of the drying action. The heated gases recirculated through the blower 46 may be at such temperatures that they will serve not only to dry the sludge particles, but also to wholly or partially oxidize some of them, namely the smaller or lighter particles, while the latter are suspended in such gases, so that when the swirling gases with such entrained oxidized particles emerge downwardly through the open lower end of the drying chamber, the particles thus entrained will be carried with the gases to and through the flue 28 without ever settling upon the solid fuel bed B. Thus, to the extent that the particles are burned while in suspension, the fuel bed B will be proportionately relieved of such tendency as they might otherwise have contributed toward clogging or smothering of the fire. The capacity of the incinerator to handle the sludge will be accordingly increased.

Since the drying chamber 34 constitutes in effect an extension of the combustion chamber, the sludge particles which settle upon the solid fuel bed B move thereon directly from the drying chamber without any loss of heat, such as would occur were they separately dried and then transferred to the combustion chamber. Thus the said sludge particles require but a minimum amount of added heat from the solid fuel bed to bring them to ignition temperature. Also, it should be noted that, as the downwardly-swirling heated gases emerge from the lower end of the drying chamber 34, they must move beneath the intake 44 of the heat recirculating blower 46 which is interposed between the drying chamber 34 and the flue 28, and at the same time will move through and be subjected to heat from the upwardly moving zone or curtain of super heated gases which moves progressively upwardly from the intensely hot mid portion of the fire bed B and into the intake 44. Thus, any entrained particles of unburned or partially burned sludge will be subjected to complete oxidation upon passing through this zone enroute to the flue 28. In order to avoid the movement of any significant or appreciable amount of such particles into the intake 44, the flow of air beneath such intake may be downwardly deflected by means of a baffle 56 depending from the top wall of the housing, rearwardly of the intake 44. Such a baffle 56 serves the further important function of deflecting the path of movement of the entrained particles downwardly toward the fuel bed to thus be exposed to an increased amount of radiated heat therefrom.

It will be apparent that, after passing through the flue 28, the exhaust gases with any entrained particles of burned sludge will pass through the scrubber 30 which will serve to remove and collect the entrained burnt sludge particles and/or fly ash, the bases then being discharged to the atmosphere through the chimney or stack 32. Throughout their lateral movement from beneath the drying chamber to the discharge flue 28, the exhaust gases and entrained particles flow immediately above and in proximity to the ignited fuel bed, so that the heat therefrom will complete the combustion of all entrained particles and gases before their discharge.

It is desirable in the operation of the apparatus that the rate of charging of the solid fuel onto the grating 14, the volume of air through the solid fuel bed B, and the rate at which teh dried sprayed particles are delivered onto the fuel bed will be so related that the temperature of the exhaust gases discharged through the flue 28 will be maintained at or above 1400 degrees Fahrenheit so as to destroy all organic odors.

In the operation of the apparatus, which is believed to be apparent from the foregoing, the burning bed of solid material B is supported on and moved continuously rearwardly by the grating 14 for discharge of the ashes of the completely consumed material into the ash pit 20.

The particles of sludge are delivered downwardly into the combustion chamber from the drying chamber at a location directly over the upwardly opening plenum 22 above the burning bed of solid fuel B, and are laterally spread or distributed across the combustion chamber by the centrifugal action of the atomizer and/or by the centrifugal forces created by the whirling streams or jets of air emerging from the nozzles 54. By such distribution, the heavier particles when received upon the solid fuel bed B, will avoid smothering same. At the same time, the lighter particles which are entrained in the gases will be burned while suspended enroute to the flue 28.

The air which is formed upwardly through the fire bed B by the blower 24 and plenum 22 not only accelerates the rate of oxidation and increases the temperature of the bed, but in addition is itself heated and utilized to provide an upwardly rising stream or flow of gases above the forward end portion of the bed and beneath the drying chamber, through which the heavier particles of material from the drying chamber must descend and be further dried and/or ignited enroute to the solid fuel bed B. In adidtion, by entraining some of the lighter particles and carrying them laterally over the fuel bed to the flue 28 while causing their combustion while thus entrained, the moving air stream reduces the load on the solid fuel bed and thus increases the over-all capacity of the apparatus accordingly.

Having thus described our invention, we claim:

1. An incinerator for sewage sludge, and solid fuel, comprising an enclosed incinerator housing defining a horizontally elongated enclosed combustion chamber and a drying chamber over the forward portion of said combustion chamber, a conveying grate within said combustion chamber for supporting a bed of ignited solid combustible material, and for moving said bed of material longitudinally from the front to the rear of said combustion chamber in a generally horizontal direction for progressive discharge of the ashes from said grate from the rear thereof, said housing being formed with a charging opening for solid combustible material over the front end portion of said grate, and a flue opening therefrom above the rear end portion of the grate, air supply means beneath said grate and said drying chamber for forcing air upwardly through said drying chamber, said air supply means comprising a plenum beneath said grate having an open upper side communicating with the grate, and means for supplying air at super-atmospheric pressure to the plenum, said drying chamber being cylindrical with one axial end opening downwardly into the combustion chamber, the upper end of said drying chamber being closed, a centrifugal atomizer supported in the upper end of said drying chamber for delivering fine particles of sludge therein, and distributing them radially of the drying chamber, a recirculating blower having an intake located over said solid fuel bed between said spray drying chamber and the flue for withdrawing heated gases from said combustion chamber and delivering same into the upper portion of the spray drying chamber, said means including an annular manifold encircling said centrifugal atomizer concentrically to the axis of said cylindrical drying chamber and having a plurality of gas discharge orifices directed tangentially to and around said axis for drying and supplementing the centrifugal spreading of the particles discharged from said atomizer, while also causing a downwardly-spiraling gas flow in said chamber to prolong the path of descent of said particles and the length of their stay in the drying chamber, said downwardly-spiraling gas flow from the drying chamber merging with the upwardly-moving gases above said solid fuel bed for rearward longitudinal movement above the solid fuel bed to said flue and beneath said intake for the recirculating blower, said blower producing an updraft of super-heated gases from the maximum temperature portion of the fuel bed to mix with and act on the entrained particles, and a depending baffle between the said intake and said flue and over said maximum temperature portion of the solid fuel bed to downwardly deflect said gases with their entrained particles and thereby to expose said particles to increased amounts of radiated heat from the fuel bed.

2. A sludge incinerator, comprising a housing defining therein a combustion chamber having forward and rear ends, a conveyor grate in said chamber for simultaneously supporting a burning solid fuel bed while moving same progressively from a charging point near the front end of the chamber rearwardly to a discharge point, means for progressively delivering combustible solid material onto said fuel bed, means for supplying a continuously upwardly flowing stream of gases through said grate and the solid fuel thereon to produce an upwardly rising stream of heated combustion gases above said solid fuel bed, means for delivering finely divided particles of sludge into and distributing them laterally in said rising stream of gases over said solid fuel bed, whereby the heavier particles will descend through said upwardly rising stream of gases onto the surface of the bed for combustion with the solid fuel while relatively lighter particles will be entrained by said stream of gases, said housing being formed with an exit port for said gases and entrained particles.

3. Apparatus as defined in claim 2, in which said exit port is located over the rear end of said grate, and in laterally rearwardly spaced relation from said charging point, to divert said combustion gases through a lateral path above said solid fuel bed, and to subject the entrained particles to heat from said bed.

4. Apparatus as defined in claim 3, including a depending baffle in said housing between said charging point and said exit port, to deflect said combustion gases downwardly toward said bed.

5. Apparatus as defined in claim 2, including a drying chamber opening downwardly toward said grate, above said stream of gases, for initial reception of said particles.

6. Apparatus as defined in claim 5, including means for forming an upwardly rising curtain of super-heated gases between said drying chamber and the exit port at a sufficiently elevated temperature to induce complete oxidation of any unburned such particles.

7. Apparatus as defined in claim 6, in which said means for causing an upflowing current of super-heated gases comprises an air recirculating blower having an intake opening located between said spraying chamber and the exit port, said grate also extending longitudinally from a location beneath said drying chamber to a location beneath said exit port and with its mid portion disposed beneath said intake, whereby the heated gases from said mid portion will be drawn upwardly through said intake.

8. Apparatus as defined in claim 7, including an annularly-arranged series of nozzles disposed in said drying chamber around and tangentially to a vertical axis and encircling said sludge particle delivering means, whereby to produce a rapid swirling and centrifugal outward spreading of said particles coincident with a heating and drying action thereon.

9. Apparatus as defined in claim 7, in which said means for spreading the particles laterally throughout the drying chamber comprises an annular duct encircling said particle delivery means, said duct communicating with and receiving heated gases from said recirculating blower, and being provided with a plurality of tangentially-directed nozzles for discharging said gases into the drying chamber tangentially to a central vertical axis, whereby to cause swirling of the heated air about said axis to produce a laterally-outward spreading away from said axis of the particles received in the chamber and to exert a drying action on said particles.

10. The method of incinerating sewage sludge, comprising the steps of maintaining an ignited bed of solid fuel, causing an upward flow of air through and above said fuel to increase the rate of combustion thereof and to heat the said air in passing through the fuel, continuously delivering finely-divided particles into said upwardly-rising heated air flow from a location directly above said ignited solid fuel whereby at least some of said particles will descend by gravity onto the solid fuel bed for combustion therewith, said rising air flow through the solid fuel bed impeding the downward movement of said particles to prolong their exposure to the heating and drying action of said upflowing heated air prior to reception on the solid fuel bed.

11. The process of incinerating sewage sludge as defined in claim 10, including the further step of subjecting the descending particles to a rapid swirling action about a vertical axis during the initial portion of their descent toward the solid fuel bed, whereby to laterally disperse the said particles and increase the uniformity of their distribution over the surface of the solid fuel bed.

12. The method as defined in claim 10, further including the steps of entraining a portion of said particles in the air flow, laterally diverting said air flow at a location spaced above said solid fuel bed and causing same to flow above and in heat-exchanging relation with the fuel bed.

13. The process defined in claim 12, including the further step of intermixing said laterally-diverted air flow with super-heated air from said fuel bed to produce combustion of the lighter particles suspended in said laterally-diverted portion of the air flow.

14. The process defined in claim 12, including the further step of deflecting said laterally flowing air stream back downwardly toward and over the maximum temperature portion of the solid fuel bed for absorption by the suspended particles of heat from said portion of the fuel bed.

References Cited
UNITED STATES PATENTS

| | | | |
|---|---|---|---|
| 1,929,424 | 10/1933 | Heaton | 110—22 |
| 2,099,827 | 11/1937 | Schrenk | 122—2 |
| 3,031,982 | 5/1962 | Gordon et al. | 110—8 |

JAMES W. WESTHAVER, *Primary Examiner.*